US010024968B2

(12) United States Patent
Hudman et al.

(10) Patent No.: US 10,024,968 B2
(45) Date of Patent: Jul. 17, 2018

(54) OPTICAL MODULES THAT REDUCE SPECKLE CONTRAST AND DIFFRACTION ARTIFACTS

(71) Applicant: Microsoft Technology Licensing, LLC, Redmond, WA (US)

(72) Inventors: Joshua Hudman, Issaquah, WA (US); Marshall DePue, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/228,982

(22) Filed: Aug. 4, 2016

(65) Prior Publication Data

US 2016/0341829 A1  Nov. 24, 2016

Related U.S. Application Data

(63) Continuation of application No. 14/034,189, filed on Sep. 23, 2013, now Pat. No. 9,462,253.

(51) Int. Cl.
*H04N 5/00* (2011.01)
*G01S 17/89* (2006.01)
(Continued)

(52) U.S. Cl.
CPC .............. *G01S 17/89* (2013.01); *G01S 7/481* (2013.01); *G01S 7/4815* (2013.01);
(Continued)

(58) Field of Classification Search
CPC ..... H01L 21/00; H01S 5/423; H01S 5/18308; H01S 5/18311; H01S 5/18344;
(Continued)

(56) References Cited

U.S. PATENT DOCUMENTS 4,603,421 A  7/1986 Scifres et al.
4,627,620 A  12/1986 Yang
(Continued)

FOREIGN PATENT DOCUMENTS

CN  101254334 B  6/2010
EP  0583061 A2  2/1994
(Continued)

OTHER PUBLICATIONS

"Final Office Action Issued in U.S. Appl. No. 14/034,189", dated Dec. 18, 2015, 19 Pages.
(Continued)

*Primary Examiner* — Frank Huang
(74) *Attorney, Agent, or Firm* — Alleman Hall Creasman & Tuttle LLP

(57) ABSTRACT

An optical module, for use in a depth camera, includes a plurality of laser emitting elements, each of which emits a corresponding laser beam, and a micro-lens array (MLA) that includes a plurality of lenslets. Laser beams emitted by adjacent laser emitting elements at least partially overlap one another prior to being incident on the MLA For each lenslet of at least a majority of the lenslets of the MLA, the lenslet is at least partially filled by light corresponding to laser beams emitted by at least two of the laser emitting elements. The inclusion of the plurality of laser emitting elements is used to reduce speckle contrast. The overlap of the laser beams, and the at least partially filling of the lenslets of the MLA with light corresponding to laser beams emitted by multiple laser emitting elements, is used to reduce diffraction artifacts.

20 Claims, 11 Drawing Sheets

(51) Int. Cl.
| | |
|---|---|
| *H04N 13/02* | (2006.01) |
| *G02B 19/00* | (2006.01) |
| *G02B 3/00* | (2006.01) |
| *G02B 27/09* | (2006.01) |
| *G02B 27/48* | (2006.01) |
| *G01S 7/481* | (2006.01) |
| *H04N 5/225* | (2006.01) |
| *H04N 5/33* | (2006.01) |
| *H04N 13/00* | (2018.01) |

(52) U.S. Cl.
CPC ....... *G02B 3/0056* (2013.01); *G02B 19/0057* (2013.01); *G02B 27/0961* (2013.01); *G02B 27/48* (2013.01); *H04N 5/2254* (2013.01); *H04N 5/2256* (2013.01); *H04N 5/33* (2013.01); *H04N 13/0022* (2013.01); *H04N 13/0207* (2013.01); *H04N 13/0228* (2013.01); *H04N 2013/0081* (2013.01)

(58) Field of Classification Search
CPC ........ H01S 5/2063; H01S 3/10; H01S 5/4025; H01S 5/40; C03C 15/00; C03C 23/00; C03C 3/076; C03C 3/093; C03C 23/004; G03F 1/08; G03F 1/14; G03F 1/144; G03F 1/50; G03F 1/54; G03F 1/60; G02B 27/0966; G02B 19/0014; G02B 19/0057
See application file for complete search history.

(56) References Cited

U.S. PATENT DOCUMENTS

| | | |
|---|---|---|
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 6/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,526,182 A * | 6/1996 | Jewell ..................... G11B 7/14 359/455 |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,122,109 A * | 9/2000 | Peake .............. B29D 11/00365 216/26 |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |

(56) References Cited

U.S. PATENT DOCUMENTS

| | | |
|---|---|---|
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,091 B2 | 11/2009 | Heusler et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,965,754 B1* | 6/2011 | Saint Clair ........... H01S 5/4031 372/50.12 |
| 3,035,612 A1 | 10/2011 | Bell et al. |
| 3,035,614 A1 | 10/2011 | Bell et al. |
| 3,035,624 A1 | 10/2011 | Bell et al. |
| 8,072,470 B2 | 12/2011 | Marks |
| 8,247,252 B2* | 8/2012 | Gauggel ................. H01S 5/423 257/88 |
| 8,308,302 B2 | 11/2012 | Lescure et al. |
| 2002/0019305 A1* | 2/2002 | Wu ........................ C03C 3/093 501/56 |
| 2002/0196414 A1 | 12/2002 | Manni et al. |
| 2006/0291509 A1* | 12/2006 | Mitra ................. G02B 27/0966 372/25 |
| 2007/0053066 A1* | 3/2007 | Mitra ................. G02B 27/0961 359/623 |
| 2008/0026838 A1 | 1/2008 | Dunstan et al. |
| 2010/0165432 A1* | 7/2010 | Laycock .................. G06E 1/04 359/107 |
| 2011/0298918 A1 | 12/2011 | McEldowney |
| 2012/0017153 A1 | 1/2012 | Matusda et al. |
| 2012/0051588 A1 | 3/2012 | McEldowney |
| 2012/0154535 A1* | 6/2012 | Yahav ................... G01S 7/4863 348/46 |
| 2012/0206782 A1 | 8/2012 | Chan et al. |
| 2013/0038941 A1 | 2/2013 | Pesach et al. |
| 2015/0085075 A1* | 3/2015 | Hudman ............ H04N 13/0207 348/46 |
| 2015/0097947 A1* | 4/2015 | Hudman ................. G01S 17/89 348/136 |
| 2016/0064898 A1* | 3/2016 | Atiya ..................... G01C 11/12 356/601 |

FOREIGN PATENT DOCUMENTS

| | | |
|---|---|---|
| EP | 1184706 A2 | 3/2002 |
| EP | 1734771 A1 | 12/2006 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2005085934 A1 | 9/2005 |

OTHER PUBLICATIONS

"Non-Final Office Action Issued in U.S. Appl. No. 14/034,189", dated Sep. 8, 2015, 19 Pages.

"Notice of Allowance Issued in U.S. Appl. No. 14/034,189", dated Jun. 8, 2016, 13 Pages.

"Understanding of Laser, Laser Diodes, Laser Diode Packaging and its Relationship to Tungsten Copper", Retrieved from <<http://www.torreyhillstech.com/Documents/Laser_package_white_paper.pdf>, Sep. 7, 2012, 18 Pages.

Trisnadi, Jahja I., "Spreckle contrast reduction in laser projection displays," SPIE International Society for Optics and Photonics Technology, Projection Displays VIII, Apr. 30, 2002, 7 pages.

Ouyang, A, et al., "Laser spreckle reduction based on angular diversity induced by Piezoelectric Benders," Journal of the European Optical Society, vol. 8, Apr. 28, 2013, 4 pages.

"Diffraction Effects," CVI Melles Griot Technical Guide, vol. 2, Issue 2, [www.cvimellesgriot.com], Jun. 2009, 3 pages.

Liau, Z.L., et al., "Microlens Integration With Diode Lasers and Coherent Phase Locking of Laser Arrays," The Lincoln Laboratory Journal, vol. 3, No. 3, Fall 1990, 10 pages.

International Search Report & Written Opinion dated Jan. 15, 2015, in PCT Patent Application No. PCT/US2014/056422 filed Sep. 23, 2014.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSPRD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

(56) References Cited

OTHER PUBLICATIONS

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International conference on Multimedia and Expo (ICME), Taipei, Taiwan.
Zhao, "Dressed Human Modeling, Detection, and Parts Localization", 2001, The Robotics Institute, Carnegie Mellon University, Pittsburgh, PA.
He, "Generation of Human Body Models", Apr. 2005, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collision of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, HP Division Incorporated.
English Machine-translation of Japanese Publication No. JP08-044490 published on Feb. 16, 1996.

* cited by examiner

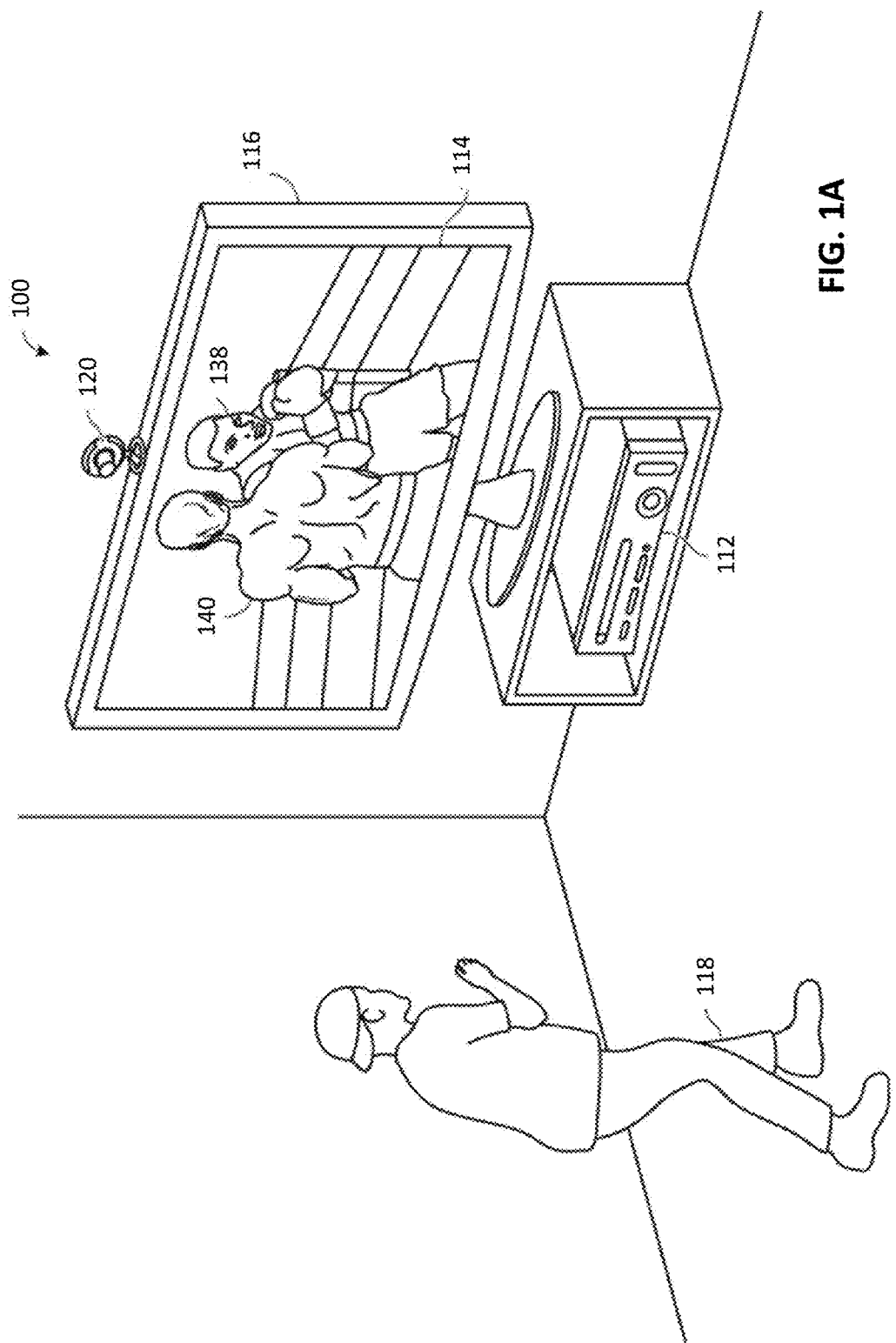

| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 20 | 30 | 30 |
|---|---|---|---|---|---|---|---|---|---|---|---|---|---|---|---|---|---|---|---|---|---|---|---|---|
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 9  | 20 | 20 | 19 | 19 | 20 | 20 | 20 | 20 | 20 | 30 | 30 |
| 30 | 15 | 15 | 15 | 16 | 16 | 16 | 18 | 8  | 8  | 9  | 9  | 9  | 9  | 9  | 9  | 9  | 9  | 19 | 19 | 20 | 20 | 20 | 30 | 30 |
| 30 | 15 | 15 | 15 | 16 | 16 | 16 | 8  | 8  | 7  | 8  | 8  | 8  | 8  | 8  | 8  | 8  | 9  | 9  | 9  | 19 | 20 | 20 | 30 | 30 |
| 30 | 15 | 15 | 16 | 16 | 16 | 8  | 7  | 7  | 6  | 7  | 7  | 7  | 7  | 7  | 7  | 8  | 8  | 9  | 9  | 9  | 20 | 20 | 30 | 30 |
| 30 | 15 | 15 | 16 | 16 | 8  | 8  | 6  | 6  | 5  | 5  | 5  | 5  | 6  | 7  | 7  | 7  | 8  | 8  | 9  | 19 | 20 | 30 | 30 | 30 |
| 30 | 15 | 15 | 16 | 7  | 7  | 7  | 6  | 5  | 5  | 5  | 5  | 5  | 5  | 7  | 6  | 7  | 8  | 8  | 9  | 19 | 20 | 30 | 30 | 30 |
| 30 | 15 | 15 | 16 | 7  | 7  | 7  | 5  | 5  | 5  | 5  | 5  | 5  | 5  | 5  | 6  | 7  | 8  | 8  | 9  | 9  | 19 | 30 | 30 | 30 |
| 30 | 15 | 15 | 16 | 7  | 7  | 6  | 5  | 5  | 5  | 5  | 5  | 5  | 5  | 5  | 6  | 7  | 8  | 8  | 9  | 9  | 19 | 30 | 30 | 30 |
| 30 | 15 | 15 | 7  | 7  | 6  | 6  | 5  | 5  | 5  | 5  | 5  | 5  | 5  | 5  | 6  | 7  | 8  | 8  | 9  | 19 | 19 | 30 | 30 | 30 |
| 30 | 15 | 15 | 6  | 6  | 5  | 6  | 5  | 5  | 5  | 4  | 4  | 5  | 4  | 4  | 6  | 7  | 8  | 8  | 9  | 19 | 20 | 30 | 30 | 30 |
| 30 | 15 | 15 | 5  | 6  | 5  | 3  | 5  | 5  | 5  | 5  | 5  | 5  | 5  | 5  | 6  | 7  | 8  | 9  | 19 | 20 | 30 | 30 | 30 | 30 |
| 30 | 15 | 15 | 4  | 5  | 4  | 4  | 5  | 5  | 5  | 5  | 5  | 5  | 5  | 5  | 6  | 7  | 8  | 9  | 19 | 19 | 30 | 30 | 30 | 30 |
| 30 | 15 | 15 | 5  | 5  | 5  | 5  | 5  | 5  | 5  | 5  | 5  | 5  | 5  | 5  | 6  | 7  | 8  | 18 | 18 | 19 | 30 | 30 | 30 | 30 |
| 30 | 15 | 15 | 15 | 5  | 4  | 5  | 5  | 5  | 5  | 5  | 5  | 5  | 5  | 5  | 6  | 7  | 8  | 18 | 18 | 18 | 30 | 30 | 30 | 30 |
| 30 | 15 | 15 | 15 | 5  | 5  | 5  | 5  | 5  | 5  | 5  | 5  | 5  | 5  | 5  | 6  | 7  | 8  | 18 | 18 | 18 | 30 | 30 | 30 | 30 |
| 30 | 15 | 15 | 15 | 15 | 5  | 5  | 5  | 5  | 5  | 5  | 5  | 5  | 5  | 5  | 6  | 7  | 8  | 18 | 18 | 18 | 30 | 30 | 30 | 30 |
| 30 | 15 | 15 | 15 | 15 | 15 | 5  | 5  | 5  | 5  | 5  | 5  | 5  | 5  | 6  | 6  | 7  | 8  | 18 | 18 | 18 | 30 | 30 | 30 | 30 |
| 30 | 15 | 15 | 15 | 15 | 15 | 5  | 5  | 5  | 5  | 5  | 5  | 5  | 6  | 7  | 8  | 18 | 18 | 18 | 18 | 30 | 30 | 30 | 30 | 30 |
| 30 | 15 | 15 | 15 | 15 | 15 | 5  | 5  | 5  | 5  | 5  | 5  | 6  | 7  | 7  | 18 | 18 | 18 | 18 | 18 | 30 | 30 | 30 | 30 | 30 |
| 30 | 15 | 15 | 15 | 15 | 15 | 5  | 5  | 5  | 5  | 5  | 6  | 6  | 7  | 7  | 18 | 18 | 18 | 18 | 18 | 30 | 30 | 30 | 30 | 30 |
| 30 | 15 | 15 | 15 | 15 | 15 | 5  | 5  | 5  | 5  | 5  | 6  | 6  | 7  | 7  | 18 | 18 | 18 | 18 | 18 | 30 | 30 | 30 | 30 | 30 |

FIG. 6

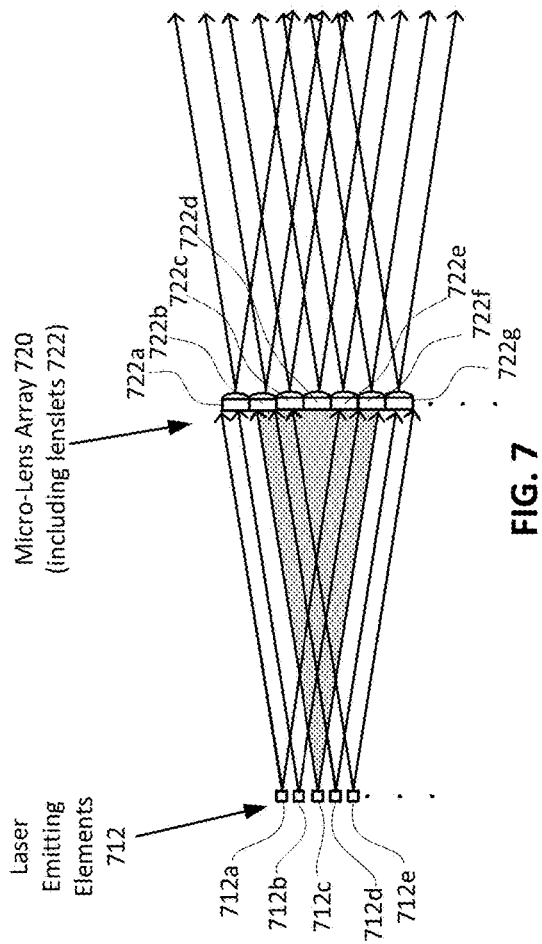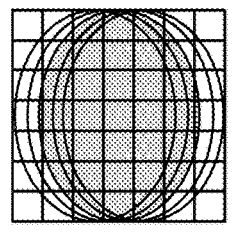

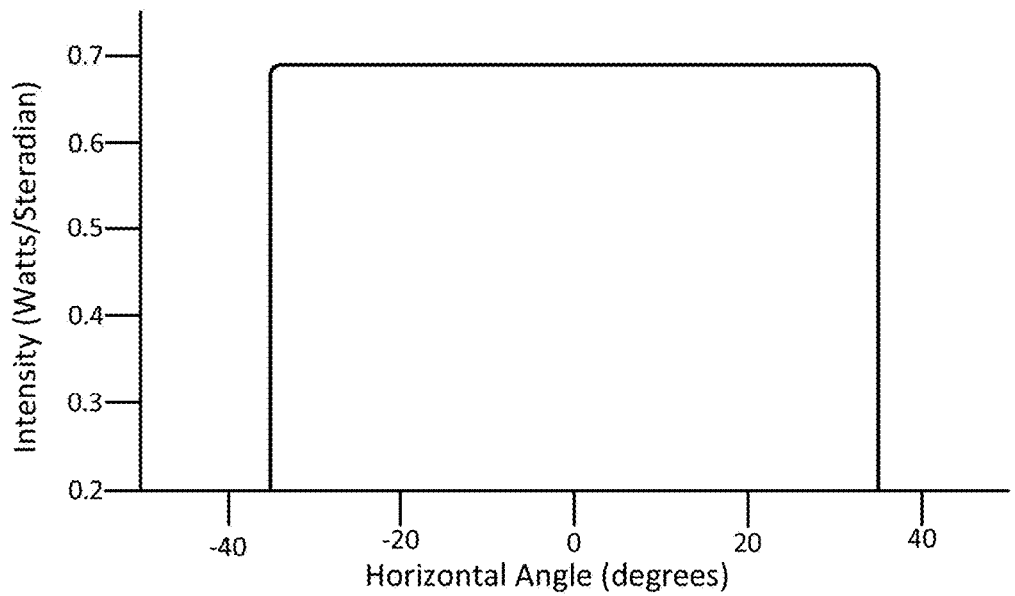
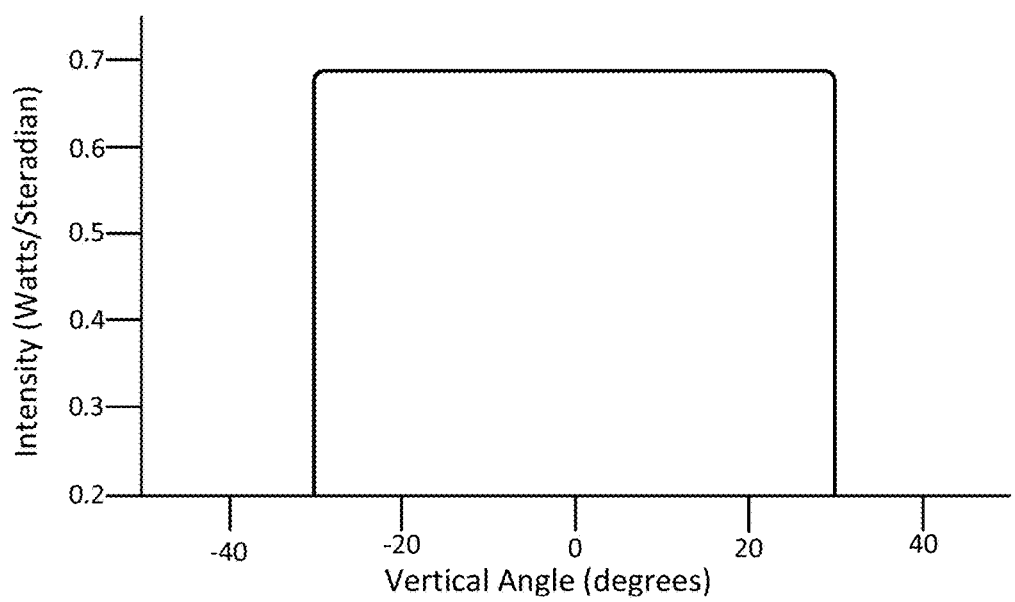
FIG. 9

US 10,024,968 B2

OPTICAL MODULES THAT REDUCE SPECKLE CONTRAST AND DIFFRACTION ARTIFACTS

PRIORITY CLAIM

This application is a continuation of and claims priority to U.S. patent application Ser. No. 14/034,189, filed Sep. 23, 2013, which is incorporated herein by reference.

BACKGROUND

A depth camera can obtain depth images including information about a location of a human or other object in a physical space. The depth images may be used by an application in a computing system for a wide variety of applications. Many applications are possible, such as for military, entertainment, sports and medical purposes. For instance, depth images including information about a human can be mapped to a three-dimensional (3-D) human skeletal model and used to create an animated character or avatar.

To obtain a depth image, a depth camera typically projects infrared (IR) light onto one or more object in the camera's field of view. The IR light reflects off the object(s) and back to the camera, where it is incident on an image pixel detector array of the camera, and is processed to determine the depth image.

If a depth camera projects highly coherent IR light, then a speckle pattern may result, which reduces the resolution of the depth images obtained using the depth camera. Additionally, if an optical structure is used to achieve a desired illumination profile, the optical structure may produce undesirable diffraction artifacts, which also reduce the resolution of the depth images obtained using the depth camera.

SUMMARY

Certain embodiments of the present technology are related to optical modules for use with depth cameras, and systems that include a depth camera, which can be referred to as depth camera systems. In accordance with an embodiment, a depth camera system includes an optical module that outputs light that illuminates the capture area. Additionally, the depth camera includes an image pixel detector array that detects a portion of the light, output by the optical module, which has reflected off one or more objects within the capture area and is incident on the image pixel detector array. In accordance with an embodiment, the optical module includes a plurality of laser emitting elements, each of which emits a corresponding laser beam, and a micro-lens array that includes a plurality of lenslets. In certain embodiments, laser beams emitted by adjacent ones of the laser emitting elements at least partially overlap one another prior to being incident on the micro-lens array. Additionally, for each lenslet of at least a majority of the lenslets of the micro-lens array, the lenslet is at least partially filled by light corresponding to laser beams emitted by at least two of the laser emitting elements. The inclusion of the plurality of laser emitting elements in the optical module reduces speckle contrast in the light that is output by the optical module and illuminates the capture area. The overlap of the laser beams emitted by adjacent ones of the laser emitting elements, and the at least partially filling of the lenslets of the micro-lens array with light corresponding to laser beams emitted by at least two of the laser emitting elements, reduces diffraction pattern artifacts in the light that is output by the optical module and illuminates the capture area.

In accordance with an embodiment, for each lenslet of the at least a majority of the lenslets of the micro-lens array, the lenslet is at least partially filled by light corresponding to laser beams emitted by at least five of the laser emitting elements. More preferably, each lenslet of the micro-lens array is completely filled by light corresponding to laser beams emitted by at least five of the laser emitting elements.

In accordance with an embodiment, the plurality of laser emitting elements include five or more edge emitting lasers. For a more specific example, the five or more edge emitting lasers can comprise five or more parallel laser stripes fabricated on a same semiconductor substrate. In alternative embodiments, the plurality of laser emitting elements comprises an array of vertical-cavity surface-emitting lasers (VCSELs).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B illustrate an example embodiment of a tracking system with a user playing a game.

FIG. 6 depicts exemplary data in an exemplary depth image.

FIG. 7 illustrates a side view of an optical module for use with a depth camera, according to an embodiment of the present technology.

FIG. 8 illustrates a front view of the micro-lens array of the optical module illustrated in FIG. 7.

FIG. 9 illustrates an exemplary desired illumination profile.

DETAILED DESCRIPTION

Certain embodiments of the present technology disclosed herein are related to optical modules for use with depth cameras, and systems that include a depth camera, which can be referred to as depth camera systems. The optical modules are designed to reduce speckle contrast and diffraction artifacts, as will be explained below. However, before providing additional details of such embodiments of the present technology, exemplary details of larger systems with which embodiments of the present technology can be used will first be described.

Figure 1B:
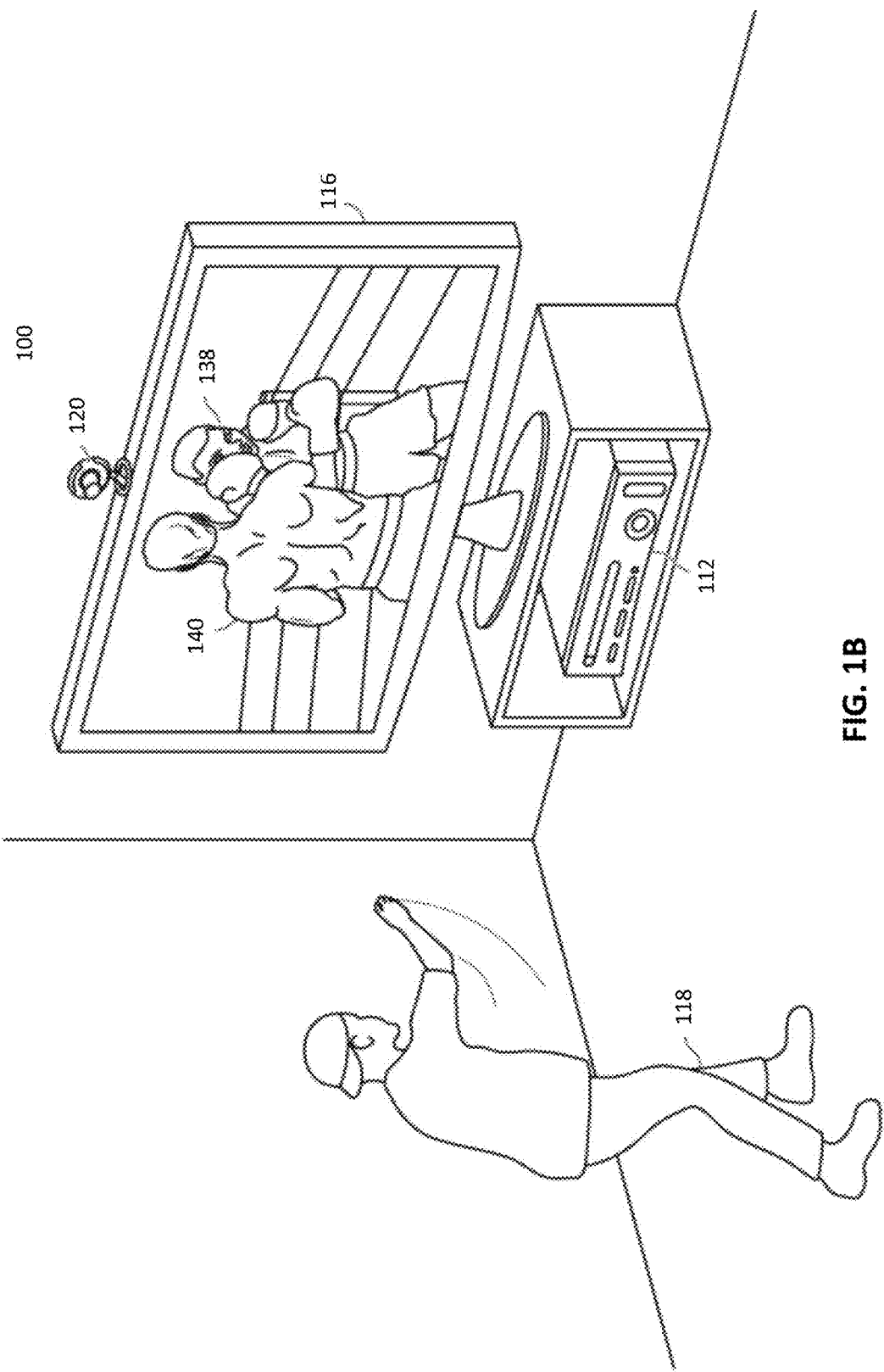

FIGS. 1A and 1B illustrate an example embodiment of a tracking system 100 with a user 118 playing a boxing video game. In an example embodiment, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 can be used to obtain depth images and color images (also known as RGB images) that can be used by the computing system 112 to identify one or more users or other objects, as well as to track motion and/or other user behaviors. The tracked motion and/or other user behavior can be used to update an application. Therefore, a user can manipulate game characters or other aspects of the application by using movement of the user's body and/or objects around the user, rather than (or in addition to) using controllers, remotes, keyboards, mice, or the like. For example, a video game system can update the position of images displayed in a video game based on the new positions of the objects or update an avatar based on motion of the user.

The computing system 112 may be a computer, a gaming system or console, or the like. According to an example embodiment, the computing system 112 may include hardware components and/or software components such that computing system 112 may be used to execute applications such as gaming applications, non-gaming applications, or the like. In one embodiment, computing system 112 may include a processor such as a standardized processor, a specialized processor, a microprocessor, or the like that may execute instructions stored on a processor readable storage device for performing the processes described herein.

The capture device 120 may include, for example, a camera that may be used to visually monitor one or more users, such as the user 118, such that gestures and/or movements performed by the one or more users may be captured, analyzed, and tracked to perform one or more controls or actions within the application and/or animate an avatar or on-screen character, as will be described in more detail below.

According to one embodiment, the tracking system 100 may be connected to an audiovisual device 116 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one embodiment, the audiovisual device 16 may be connected to the computing system 112 via, for example, an S-Video cable, a coaxial cable, an HDMI cable, a DVI cable, a VGA cable, component video cable, or the like.

As shown in FIGS. 1A and 1B, the tracking system 100 may be used to recognize, analyze, and/or track a human target such as the user 118. For example, the user 118 may be tracked using the capture device 120 such that the gestures and/or movements of user 118 may be captured to animate an avatar or on-screen character and/or may be interpreted as controls that may be used to affect the application being executed by computing system 112. Thus, according to one embodiment, the user 118 may move his or her body to control the application and/or animate the avatar or on-screen character.

In the example depicted in FIGS. 1A and 1B, the application executing on the computing system 112 may be a boxing game that the user 118 is playing. For example, the computing system 112 may use the audiovisual device 116 to provide a visual representation of a boxing opponent 138 to the user 118. The computing system 112 may also use the audiovisual device 116 to provide a visual representation of a player avatar 140 that the user 118 may control with his or her movements. For example, as shown in FIG. 1B, the user 118 may throw a punch in physical space to cause the player avatar 140 to throw a punch in game space. Thus, according to an example embodiment, the computer system 112 and the capture device 120 recognize and analyze the punch of the user 118 in physical space such that the punch may be interpreted as a game control of the player avatar 140 in game space and/or the motion of the punch may be used to animate the player avatar 140 in game space.

Other movements by the user 118 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 140. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 118 may be available, used, and analyzed in any suitable manner to interact with an application.

In example embodiments, the human target such as the user 118 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self-propelled objects. In addition to boxing, other games can also be implemented.

According to other example embodiments, the tracking system 100 may further be used to interpret target movements as operating system and/or application controls that are outside the realm of games. For example, virtually any controllable aspect of an operating system and/or application may be controlled by movements of the target such as the user 118.

Figure 2A:
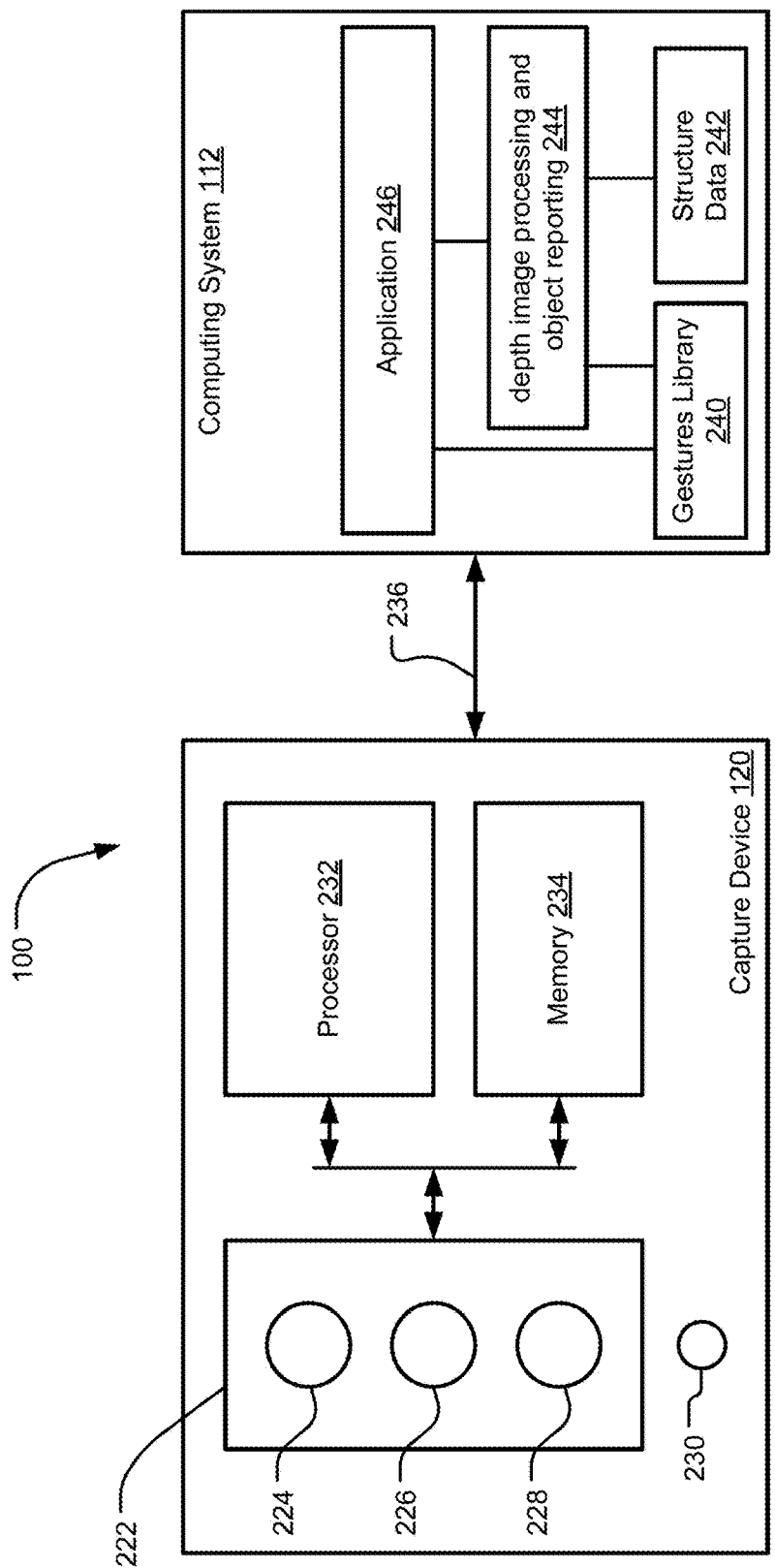
FIG. 2A illustrates an example embodiment of a capture device that may be used as part of the tracking system.

FIG. 2A illustrates an example embodiment of the capture device 120 that may be used in the tracking system 100. According to an example embodiment, the capture device 120 may be configured to capture video with depth information including a depth image that may include depth values via any suitable technique including, for example, time-of-flight, structured light, stereo image, or the like. According to one embodiment, the capture device 120 may organize the depth information into "Z layers," or layers that may be perpendicular to a Z axis extending from the depth camera along its line of sight.

As shown in FIG. 2A, the capture device 120 may include an image camera component 222. According to an example embodiment, the image camera component 222 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2A, according to an example embodiment, the image camera component 222 may include an infra-red (IR) light component 224, a three-dimensional (3-D) camera 226, and an RGB camera 228 that may be used to capture the depth image of a scene. For example, in time-of-flight (TOF) analysis, the IR light component 224 of the capture device 120 may emit an infrared light onto the scene and may then use sensors (not specifically shown in FIG. 2A) to detect the backscattered light from the surface of one or more targets and objects in the scene using, for example, the 3-D camera 226 and/or the RGB camera 228. In some embodiments, pulsed IR light may be used such that the time between an outgoing light pulse and a corresponding incoming light pulse may be measured and used to determine a physical distance from the capture device 120 to a particular location on the targets or objects in the scene. Additionally or alternatively, the phase of the outgoing light wave may be compared to the phase of the incoming light wave to determine a phase shift. The phase shift may then be used to determine a physical distance from the capture device to a particular location on the targets or objects. Additional details of an exemplary TOF type of 3-D camera 226, which can also be referred to as a depth camera, are described below with reference to FIG. 2B.

According to another example embodiment, TOF analysis may be used to indirectly determine a physical distance from the capture device 120 to a particular location on the targets or objects by analyzing the intensity of the reflected beam of light over time via various techniques including, for example, shuttered light pulse imaging.

In another example embodiment, the capture device 120 may use a structured light to capture depth information. In such an analysis, patterned light (i.e., light displayed as a known pattern such as grid pattern, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 228 and may then be analyzed to determine a physical distance from the capture device to a particular location on the targets or objects. In some implementations, the IR Light component 224 is displaced from the cameras 226 and 228 so triangulation can be used to determined distance from cameras 226 and 228. In some implementations, the capture device 120 will include a dedicated IR sensor to sense the IR light.

According to another embodiment, the capture device 120 may include two or more physically separated cameras that may view a scene from different angles to obtain visual stereo data that may be resolved to generate depth information. Other types of depth image sensors can also be used to create a depth image.

The capture device 120 may further include a microphone 230. The microphone 230 may include a transducer or sensor that may receive and convert sound into an electrical signal. According to one embodiment, the microphone 230 may be used to reduce feedback between the capture device 120 and the computing system 112 in the target recognition, analysis, and tracking system 100. Additionally, the microphone 230 may be used to receive audio signals (e.g., voice commands) that may also be provided by the user to control applications such as game applications, non-game applications, or the like that may be executed by the computing system 112.

In an example embodiment, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example embodiment, the memory component 234 may include random access memory (RAM), read only memory (ROM), cache, Flash memory, a hard disk, or any other suitable storage component. As shown in FIG. 2A, in one embodiment, the memory component 234 may be a separate component in communication with the image capture component 222 and the processor 232. According to another embodiment, the memory component 234 may be integrated into the processor 232 and/or the image capture component 222.

As shown in FIG. 2A, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a, or n connection. According to one embodiment, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one embodiment, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, depth image processing and object reporting module 244 and application 246. Depth image processing and object reporting module 244 uses the depth images to track motion of objects, such as the user and other objects. To assist in the tracking of the objects, depth image processing and object reporting module 244 uses gestures library 240 and structure data 242.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with various controls of an application. Thus, the computing system 112 may use the gestures library 240 to interpret movements of the skeletal model and to control application 246 based on the movements. As such, gestures library may be used by depth image processing and object reporting module 244 and application 246.

Application 246 can be a video game, productivity application, etc. In one embodiment, depth image processing and object reporting module 244 will report to application 246 an identification of each object detected and the location of the object for each frame. Application 246 will use that information to update the position or movement of an avatar or other images in the display.

Figure 2B:
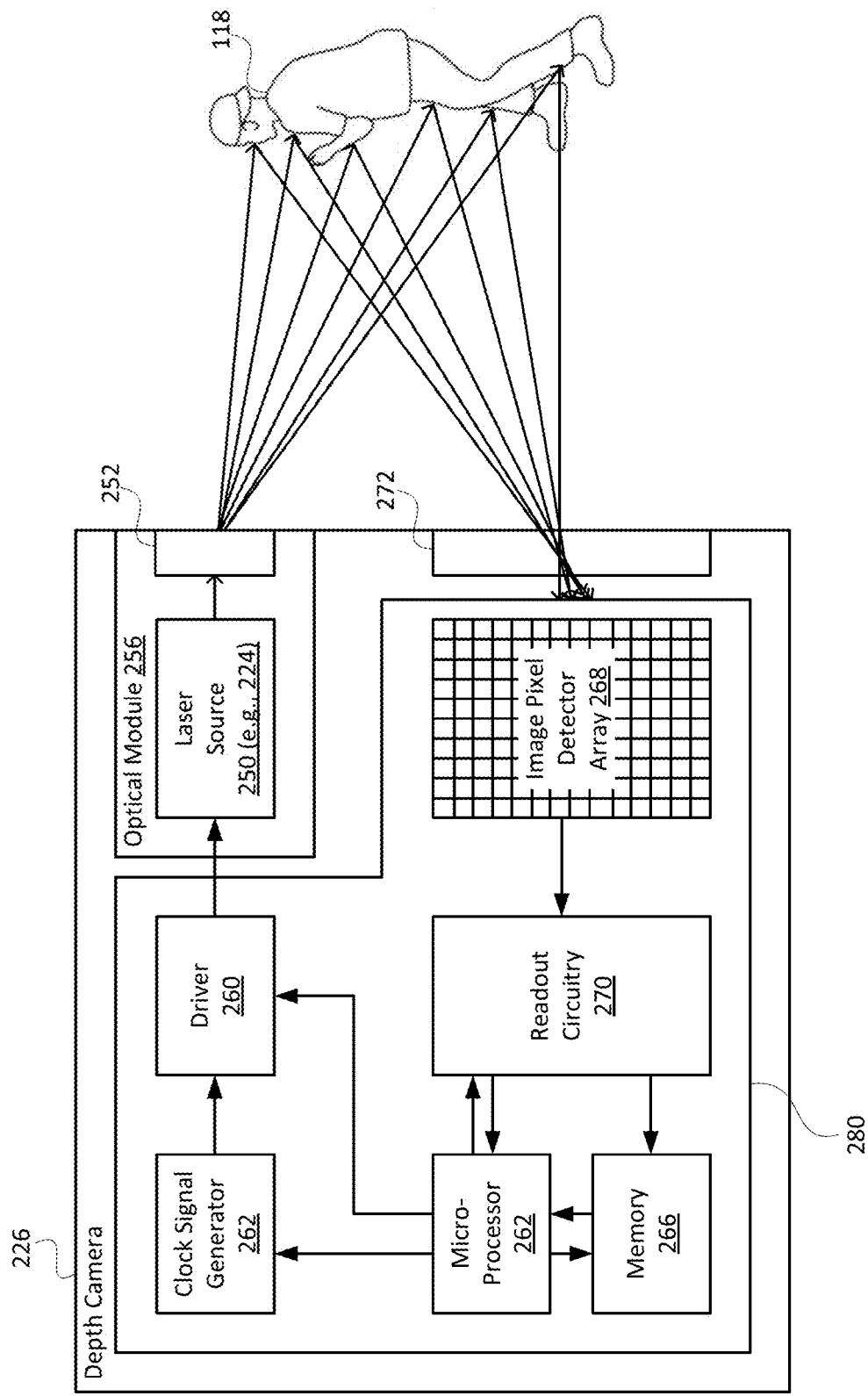
FIG. 2B illustrates an exemplary embodiment of a depth camera that may be part of the capture device of FIG. 2A.

FIG. 2B illustrates an example embodiment of a 3-D camera 226, which can also be referred to as a depth camera 226. The depth camera 226 is shown as including a driver 260 that drives a laser source 250 of an optical module 256. The laser source 250 can be, e.g., the IR light component 224 shown in FIG. 2A. More specifically, the laser source 250 can include one or more laser emitting elements, such as, but not limited to, edge emitting lasers or vertical-cavity surface-emitting lasers (VCSELs). While it is likely that such laser emitting elements emit IR light, light of alternative wavelengths can alternatively be emitted by the laser emitting elements.

The depth camera 226 is also shown as including a clock signal generator 262, which produces a clock signal that is provided to the driver 260. Additionally, the depth camera 226 is shown as including a microprocessor 264 that can control the clock signal generator 262 and/or the driver 260. The depth camera 226 is also shown as including an image pixel detector array 268, readout circuitry 270 and memory 266. The image pixel detector array 268 might include, e.g., 320×240 image pixel detectors, but is not limited thereto. Each image pixel detector can be, e.g., a complementary metal-oxide-semiconductor (CMOS) sensor or a charged coupled device (CCD) sensor, but is not limited thereto. Depending upon implementation, each image pixel detector can have its own dedicated readout circuit, or readout circuitry can be shared by many image pixel detectors. In accordance with certain embodiments, the components of the depth camera 226 shown within the block 280 are implemented in a single integrated circuit (IC), which can also be referred to as a single chip.

In accordance with an embodiment, the driver 260 produces a high frequency (HF) modulated drive signal in dependence on a clock signal received from clock signal generator 262. Accordingly, the driver 260 can include, for example, one or more buffers, amplifiers and/or modulators, but is not limited thereto. The clock signal generator 262 can include, for example, one or more reference clocks and/or voltage controlled oscillators, but is not limited thereto. The microprocessor 264, which can be part of a microcontroller unit, can be used to control the clock signal generator 262 and/or the driver 260. For example, the microprocessor 264 can access waveform information stored in the memory 266 in order to produce an HF modulated drive signal. The depth camera 226 can includes its own memory 266 and microprocessor 264, as shown in FIG. 2B. Alternatively, or additionally, the processor 232 and/or memory 234 of the capture device 120 can be used to control aspects of the depth camera 226.

In response to being driven by an HF modulated drive signal, the laser source 250 emits HF modulated light. For an example, a carrier frequency of the HF modulated drive signal and the HF modulated light can be in a range from about 30 MHz to many hundreds of MHz, but for illustrative purposes will be assumed to be about 100 MHz. The light emitted by the laser source 250 is transmitted through an optical structure 252, which can include a micro-lens array (MLA), towards one or more target object (e.g., a user 118). The laser source 250 and the optical structure 252 can be referred to, collectively, as an optical module 256. In accordance with certain embodiments of the present technology, discussed below with reference to FIGS. 7-9, the laser source 250 includes a plurality of laser emitting elements. In such embodiments, the optical structure 252 includes a micro-lens array (MLA) that receives a plurality of laser beams, output by the plurality of laser emitting elements of the laser source 250, and outputs light having an illumination profile that is substantially equal to a desired illumination profile.

Assuming that there is a target object within the field of view of the depth camera, a portion of the light emitted by the optical module reflects off the target object, passes through an aperture field stop and lens (collectively 272), and is incident on the image pixel detector array 268 where an image is formed. In some implementations, each individual image pixel detector of the array 268 produces an integration value indicative of a magnitude and a phase of detected HF modulated laser beam originating from the optical module 256 that has reflected off the object and is incident of the image pixel detector. Such integrations values, or more generally time-of-flight (TOF) information, enable distances (Z) to be determined, and collectively, enable depth images to be produced. In certain embodiments, optical energy from the light source 250 and detected optical energy signals are synchronized to each other such that a phase difference, and thus a distance Z, can be measured from each image pixel detector. The readout circuitry 270 converts analog integration values generated by the image pixel detector array 268 into digital readout signals, which are provided to the microprocessor 264 and/or the memory 266, and which can be used to produce depth images.

Figure 3:
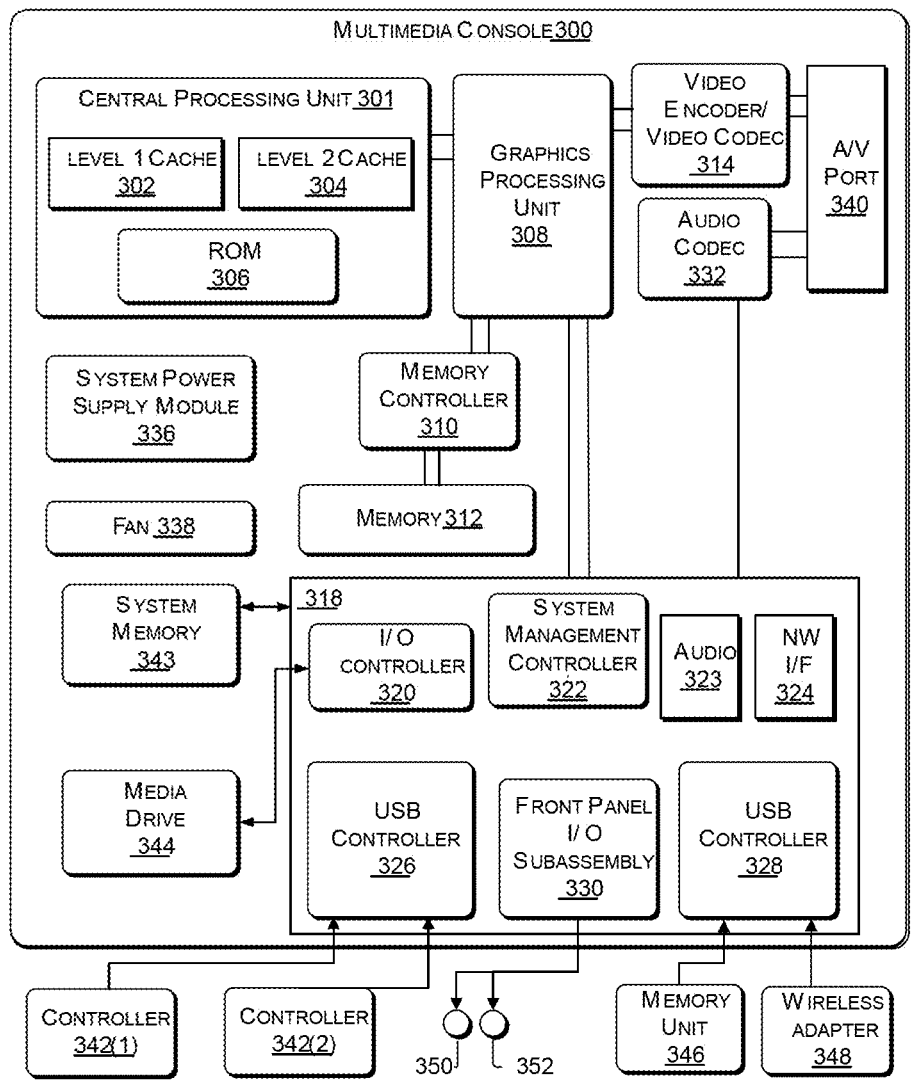
FIG. 3 illustrates an example embodiment of a computing system that may be used to track user behavior and update an application based on the user behavior.

FIG. 3 illustrates an example embodiment of a computing system that may be the computing system 112 shown in FIGS. 1A-2B used to track motion and/or animate (or otherwise update) an avatar or other on-screen object displayed by an application. The computing system such as the computing system 112 described above with respect to FIGS. 1A-2 may be a multimedia console, such as a gaming console. As shown in FIG. 3, the multimedia console 300 has a central processing unit (CPU) 301 having a level 1 cache 102, a level 2 cache 304, and a flash ROM (Read Only Memory) 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

The multimedia console 300 includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, Blu-Ray drive, hard disk drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 Kbps), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 300 via USB controller 326 or other interface.

Figure 4:
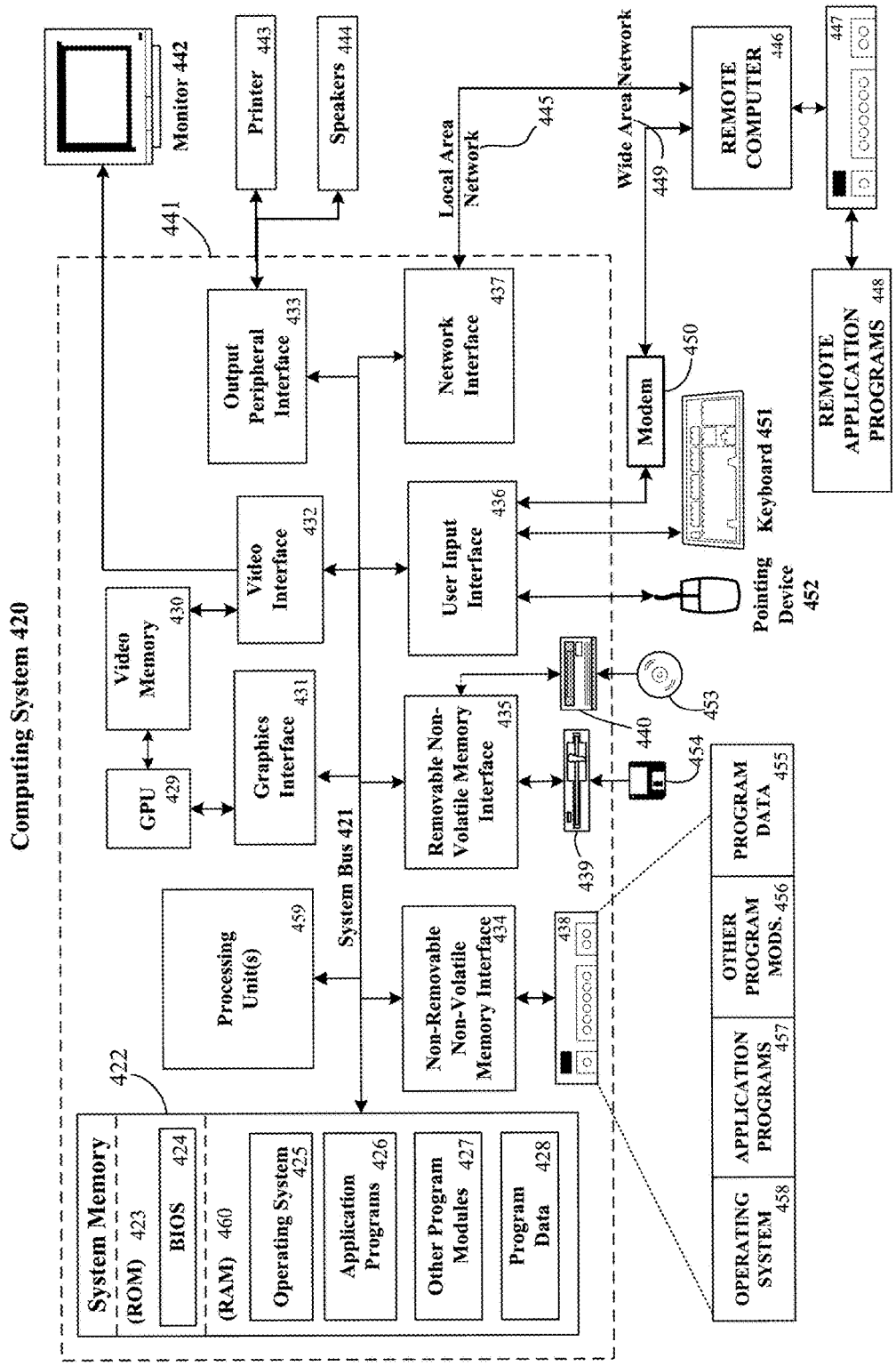
FIG. 4 illustrates another example embodiment of a computing system that may be used to track user behavior and update an application based on the tracked user behavior.

FIG. 4 illustrates another example embodiment of a computing system 420 that may be the computing system 112 shown in FIGS. 1A-2B used to track motion and/or animate (or otherwise update) an avatar or other on-screen object displayed by an application. The computing system 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary computing system 420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 226, 228 and capture device 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433. Capture Device 120 may connect to computing system 420 via output peripheral interface 433, network interface 437, or other interface.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates application programs 448 as residing on memory device 447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 5:
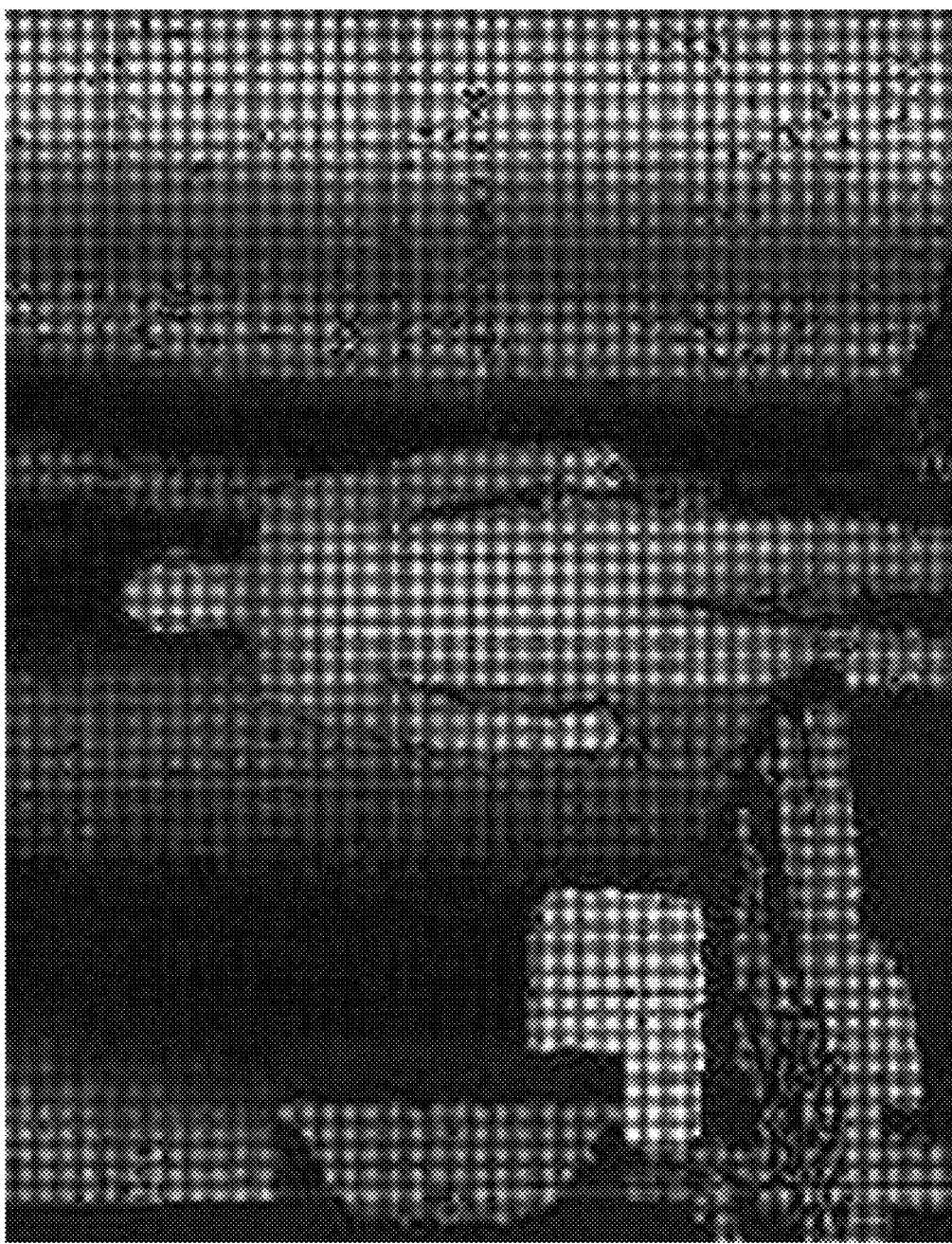
FIG. 5 illustrates an exemplary depth image.

FIG. 5 illustrates an example embodiment of a depth image that may be received at computing system 112 from capture device 120. According to an example embodiment, the depth image may be an image and/or frame of a scene captured by, for example, the 3-D camera 226 and/or the RGB camera 228 of the capture device 120 described above with respect to FIG. 2A. As shown in FIG. 5, the depth image may include a human target corresponding to, for example, a user such as the user 118 described above with respect to FIGS. 1A and 1B and one or more non-human targets such as a wall, a table, a monitor, or the like in the captured scene. The depth image may include a plurality of observed pixels where each observed pixel has an observed depth value associated therewith. For example, the depth image may include a two-dimensional (2-D) pixel area of the captured scene where each pixel at particular x-value and y-value in the 2-D pixel area may have a depth value such as a length or distance in, for example, centimeters, millimeters, or the like of a target or object in the captured scene from the capture device. In other words, a depth image can specify, for each of the pixels in the depth image, a pixel location and a pixel depth. Following a segmentation process, each pixel in the depth image can also have a segmentation value associated with it. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. The segmentation value is used to indicate whether a pixel corresponds to a specific user, or does not correspond to a user.

In one embodiment, the depth image may be colorized or grayscale such that different colors or shades of the pixels of the depth image correspond to and/or visually depict different distances of the targets from the capture device 120. Upon receiving the image, one or more high-variance and/or noisy depth values may be removed and/or smoothed from the depth image; portions of missing and/or removed depth information may be filled in and/or reconstructed; and/or any other suitable processing may be performed on the received depth image.

FIG. 6 provides another view/representation of a depth image (not corresponding to the same example as FIG. 5). The view of FIG. 6 shows the depth data for each pixel as an integer that represents the distance of the target to capture device 120 for that pixel. The example depth image of FIG. 6 shows 24×24 pixels; however, it is likely that a depth image of greater resolution would be used.

Techniques for Reducing Speckle Contrast and Diffraction Artifacts

As mentioned above, if a depth camera projects highly coherent light, then a speckle pattern may result, which reduces the resolution of the depth images obtained using the depth camera. The aforementioned speckle pattern is a result of the interference of many waves of the same frequency, having different phases and amplitudes, which add together to give a resultant wave whose amplitude, and therefore intensity, varies randomly. Such speckle patterns will often occur where a laser source, or more generally, a light source, produces highly coherent light. As also mentioned above, if an optical structure is used to achieve a desired illumination profile, the optical structure may produce undesirable diffraction pattern artifacts, which also reduce the resolution of the depth images obtained using the depth camera. Such diffraction pattern artifacts, which can also be referred to as diffraction artifacts, will often occur where the optical structure is a periodic structure. An example of a periodic structure is a micro-lens array (MLA) including an N×M arrays of substantially identical lenslets.

Certain embodiments described herein are directed to depth camera systems that include optical modules that reduce speckle contrast and diffraction pattern artifacts, and thereby, provide for improved depth image resolution. Embodiments are also directed to the optical modules themselves, as well as methods for use with depth camera systems.

FIG. 7 illustrates a side view of an optical module 702, according to an embodiment. This optical module 702 can be used, for example, as the optical module 256 described above with reference to the depth camera 226 shown in FIG. 2B. Referring to FIG. 7, the optical module 702 is shown as including a plurality of laser emitting elements 712a, 712b, 712c, 712d and 712e, which can collectively be referred to as laser emitting elements 712, and can individually be referred to as a laser emitting element 712. The optical module 702 is also shown as including a micro-lens array (MLA) 720 that includes a plurality of lenslets 722a, 722b, 722c, 722d, 712e, 722f and 722g. Multiple ones of the lenslets can collectively be referred to as lenslets 722, and can individually be referred to as a lenslet 722. While five laser emitting elements 712 are shown in FIG. 7, the optical module 702 can include more or less than five laser emitting element 712. However, it should be noted that where there is a desire to minimize speckle contrast, typically the greater the number of laser emitting elements the lower the speckle contrast that can be achieved.

In certain embodiments, each light emitting element 712 is an edge emitting laser. For example, the plurality of light emitting elements 712 can include a plurality of parallel edge emitting laser stripes fabricated on a same semiconductor substrate. In other embodiments, the plurality of light emitting elements 712 can be an array of vertical-cavity surface-emitting lasers (VCSELs) fabricated on a same semiconductor substrate. These are just a few examples, which are not meant to be all encompassing.

Since FIG. 7 is a side view of the optical module 702, only one column of the lenslets 722 of the MLA 720 can be seen in FIG. 7. FIG. 8, which illustrates a front view of the MLA 720, shows that the MLA 720, in accordance with an embodiment, actually includes a two-dimensional array of lenslets 722. In FIG. 8 the MLA 720 is shown as including a 7×7 array of lenslets 722, with each of the squares shown in FIG. 8 being a separate lenslet 722. However, depending on the desired illumination profile, the MLA can include some other number of lenslets 722. For example, the MLA 720 can include an array of 10×15 lenslets 722, but is not limited thereto. It is noted that the relative sizes of the light emitting elements 712 and the lenslets 722 are not drawn to scale in FIGS. 7 and 8.

FIGS. 7 and 8 also illustrate, pictorially, the laser beams emitted by the light emitting elements 712. More specifically, in FIG. 7, each laser beam is pictorially illustrated by a pair of lines emanating, with an angle of divergence, from a respective one of the light emitting elements 712. In FIG. 8, it is assumed that the laser emitting elements 712 are behind the MLA 720 and each laser beam is illustrates as an oval footprint that is incident on the MLA 720. To help differentiate one exemplary laser beam from the other laser beams, in FIGS. 7 and 8 the laser beam emitted by the light emitting element 712c has been shaded.

In accordance with specific embodiments, the laser beams emitted by adjacent ones of the laser emitting elements 712 at least partially overlap one another prior to being incident on the MLA 720, as shown in FIGS. 7 and 8. Additionally, in accordance with specific embodiment, for each lenslet 722, of at least a majority of the lenslets 722 of the MLA 720, the lenslet 722 is at least partially filled by light corresponding to laser beams emitted by at least two of the laser emitting elements 712.

The inclusion of the plurality of laser emitting elements 712 in the optical module 702, and the overlapping of the laser beams emitted from the laser emitting elements 712, reduces the speckle contrast in the light that is output by the optical module 702, which is used to illuminate a capture area within a field of view of the depth camera. Additionally, the overlapping of the laser beams emitted by the laser emitting elements 712, and the at least partially filling of the lenslets 722 of the MLA 720 with light corresponding to laser beams emitted by at least two of the laser emitting elements 712, is used to the reduce diffraction pattern artifacts in the light that is output by the optical module 702, which is used to illuminates the capture area.

In general, the greater the number of laser emitting elements 712 and the greater the amount of overlap between the laser beams emitted by the laser emitting elements 712, the lower the speckle contrast. This is because an increase in the number of laser emitting elements 712, which are specially separated from one another, decreases the coherence of the light collectively output by the laser emitting elements 712. In general, the lower the coherence of the light, the lower the speckle contrast. Where there is a desire to achieve a speckle contrast of 20% or less, the optical module 702 would likely need to include at least five laser emitting elements 712 that emit laser beams that at least partially overlap one another. More specifically, speckle contrast will reduce by approximately the square root of the number of separate light emitting elements 712 that emit laser beams that at least partially overlap one another.

Additionally, the greater the amount of laser beams that at least partially fill each lenslet 722 of the MLA 720, the lower the diffraction artifacts caused by the light output by the optical module 702. This is because the diffraction artifacts, associated with the multiple laser beams that at least partially fill a common lenslet, are essentially averaged, thereby causing the diffraction artifacts to be washed or smoothed out. In generally, the greater the f-number of a lenslet, the greater the amount of beam overlap necessary to reduce diffraction artifacts to a predetermined desire level.

In an exemplary embodiment, the optical module 702 includes approximately ten parallel edge emitting laser stripes fabricated on a same semiconductor substrate, with each laser beam emitted by each light emitting element 712 (i.e., each laser stripe in this embodiment) at least partially overlapping each of the other laser beams emitted by each of the other light emitting elements 712, and with each laser beam at least partially filling each of the lenslets 722 of the MLA 720. In another exemplary embodiment, the optical module 702 includes an array of VCELSs that includes hundreds of VCELSs, with each laser beam emitted by each light emitting element 712 (i.e., each VCSEL in this embodiment) at least partially overlapping each of the other laser beams emitted by each of the other light emitting elements 712, and with each laser beam at least partially filling each of the lenslets 722 of the MLA 720. Preferably, each laser beam emitted by each light emitting element 712 completely fills each lenslet 722 of the MLA 720. However, depending upon implementation, it may be difficult for lenslets 722 near at the periphery of the MLA 720 to be filled by every laser beam. In order for the laser beam emitted by each light emitting element 712 to at least partially overlap the laser beams emitted by each of the other light emitting elements 712, and for each laser beam to at least partially fill each lenslet 722 of the MLA 720, the center-to-center distance between adjacent light emitting elements 712 may need to be very small. For example, in accordance with certain embodiments of the optical module 702, the center-to-center distance between adjacent light emitting elements 712 is less than 100 μm, and the center-to-center distance between any one light emitting element 712 and the light emitting element 712 furthest from it is less than 1 mm. Other center-to-center distances are also possible and within the scope of an embodiment.

In accordance with certain embodiments, the light exiting the micro-lens array 720 is the light output by an optical module 702 that is used to illuminate a capture area. However, before illuminating the capture area the light might first pass through a glass or plastic plate (not shown) that is intended to conceal and/or protect the optical module 702. It is also possible, and within the scope of an embodiment, that one or more additional optical elements be located optically downstream from the micro-lens array 720. Such one or more additional optical elements, or a portion thereof, may or may not be part of the optical module 702.

In accordance with certain embodiments, a depth camera may include multiple optical modules 702 that simultaneously output light for use in illuminating a capture area. Multiple optical modules 702 may be used, for example, where the amount of light emitted by a single optical module 702 is less than the total amount of light desired. This is analogous to an conventional camera having a flash including multiple flash bulbs, because a single flash bulb is not as bright as desired. Where a depth camera includes multiple optical modules 702, each of the optical modules will includes its own plurality of laser emitting elements 712 and its own MLA 720. The different optical modules 702 can be located close enough to one another such that the light output be each of the different optical module 702 substantially overlap one another, and are collectively used to achieve an illumination profile that is substantially similar to a desired illumination profile. FIG. 9 illustrates an exemplary desired illumination profile that can be achieved, depending upon implementation, using a single optical module 702, or multiple optical modules 702. Other desired illumination profiles are possible and can be achieved using one or more of the optical modules described herein.

Figure 10:
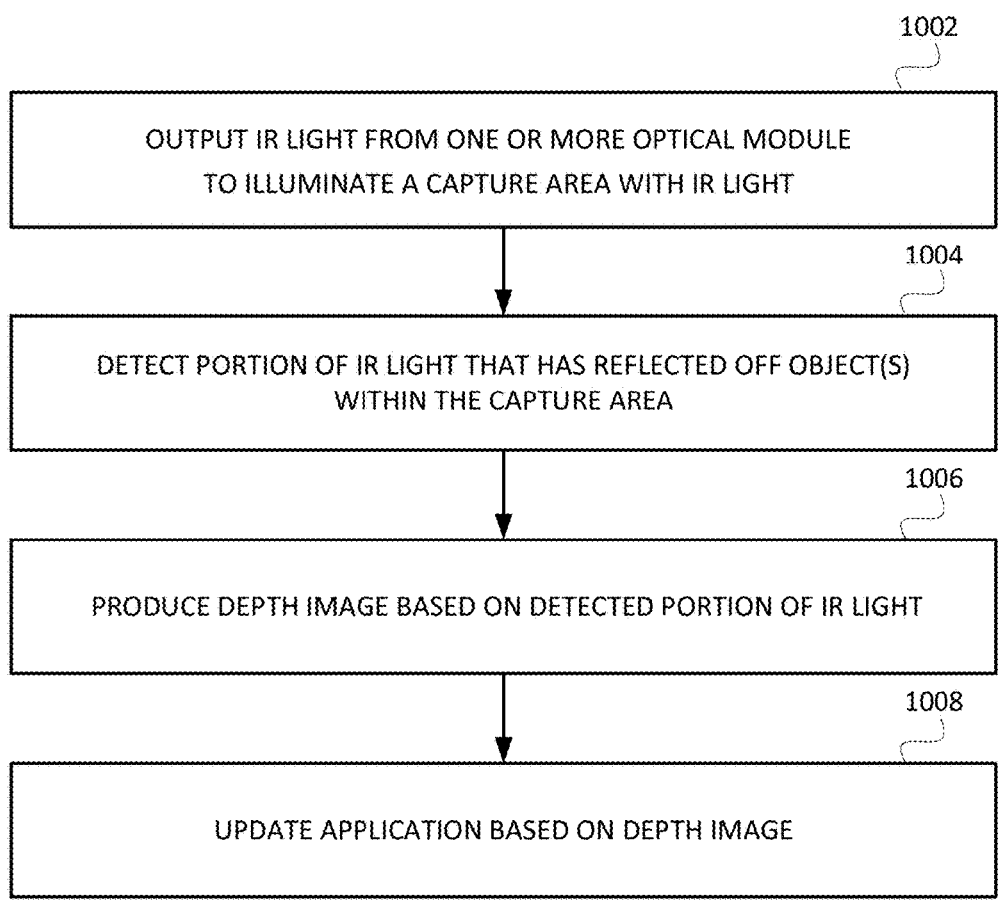
FIG. 10 is a high level flow diagram that is used to summarize methods according to various embodiments of the present technology.

FIG. 10 is a high level flow diagram that is used to summarize methods according to various embodiments of the present technology. Such methods are for use with a depth camera, especially a depth camera that produces depth images based on time-of-flight (TOF) measurements.

Referring to FIG. 10, at step 1002, infrared (IR) light is output by one or more optical module to thereby illuminate a capture area, within the field-of-view of the depth camera, with the IR light. As was explain above in the discussion of FIGS. 7 and 8, the light output by an optical module can be produced by emitting a plurality of separate laser beams towards a micro-lens array (of the optical module) that includes a plurality of lenslets such that adjacent laser beams at least partially overlap one another prior to being incident on the micro-lens array, and such that for each lenslet of at least a majority of the lenslets of the micro-lens array, is at least partially filled by light corresponding to at least two of the laser beams. In accordance with certain embodiments, each of the laser beams at least partially overlaps each of the other laser beams of the plurality of separate laser beams, prior to the plurality of laser beams being incident on the micro-lens array. In accordance with certain embodiments, each lenslet of the micro-lens array of the optical module, is at least partially filled by each laser beam of the plurality of laser beams. In specific embodiments, each lenslet of at least a majority of the lenslets of a micro-lens array, is completely filled by at least five laser beams, to thereby achieve relatively low diffraction artifacts. Additional and alternative details of step 1002 can be appreciated from the above description of FIGS. 7 and 8.

At step 1004 a portion of the IR light that has reflected off one or more objects within the capture area is detected. As can be appreciated by the above discussion of FIG. 2B, an image pixel detector array (e.g., 268 in FIG. 2B) can be used to perform step 1004. At step 1006, a depth image is produced based on the portion of the IR light detected at step 1004. At step 1008, an application is updated based on the depth image. For example, the depth image can be used to change a position or other aspect of a game character, or to control an aspect of a non-gaming application, but is not limited thereto. Additional details of methods of embodiments of the present technology can be appreciated from the above discussion of FIGS. 1A-8.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A depth camera system for use in obtaining a depth image of a capture area, comprising:
   an optical module configured to output infrared (IR) light that illuminates the capture area;
   an image pixel detector array configured to detect a portion of the IR light, output by the optical module, that has reflected off one or more objects within the capture area and is incident on the image pixel detector array; and
   a processor configured to produce the depth image based on the portion of the IR light detected by the image pixel detector;
   wherein the optical module includes
      a plurality of laser emitting elements each of which is operable to emit a corresponding IR laser beam; and
      a micro-lens array including a two-dimensional array of substantially identical lenslets provided along two axes on a common surface of the micro-lens array;
      wherein adjacent ones of the laser emitting elements are configured to emit IR laser beams that at least partially overlap one another prior to being incident on the micro-lens array;
      wherein a number of lenslets, in the two-dimensional array of lenslets provided on the common surface of the micro-lens array, is greater than a number of laser emitting elements;
      wherein a center-to-center distance between any two of the laser emitting elements that are adjacent to one another is less than 100 μm; and
      wherein a center-to-center distance between any two of the laser emitting elements that are not adjacent to one another is less than 1 mm.

2. The depth camera system of claim 1, wherein for each lenslet of at least a majority of the lenslets in the two-dimensional array of lenslets provided on the common surface of the micro-lens array, the lenslet is configured to be at least partially filled by IR light corresponding to IR laser beams emitted by more than one of the plurality of laser emitting elements.

3. The depth camera system of claim 2, wherein:
   the inclusion of the plurality of laser emitting elements in the optical module reduces speckle contrast in the IR light that is output by the optical module and illuminates the capture area; and
   the overlap of the IR laser beams emitted by adjacent ones of the laser emitting elements, and the at least partially filling of the lenslets of the micro-lens array with IR light corresponding to IR laser beams emitted by more than one of the laser emitting elements, reduces diffraction pattern artifacts in the IR light that is output by the optical module and illuminates the capture area.

4. The depth camera system of claim 1, wherein:
   the two-dimensional array of lenslets provided on the common surface of the micro-lens array of the optical module comprises at least a 7×7 array of lenslets provided on the common surface of the micro-lens array; and
   for each lenslet of at least a majority of the lenslets, in the at least 7×7 array of lenslets provided on the common surface of the micro-lens array, the lenslet is configured to be at least partially filled by IR light corresponding to IR laser beams emitted by more than one of the laser emitting elements.

5. The depth camera system of claim 1, wherein for each lenslet of at least a majority of the lenslets in the two-dimensional array of lenslets provided on the common surface of the micro-lens array, the lenslet is configured to be completely filled by IR light corresponding to IR laser beams emitted by more than one of the laser emitting elements.

6. The depth camera system of claim 1, wherein the plurality of laser emitting elements comprise five or more edge emitting lasers fabricated on a same semiconductor substrate.

7. The depth camera system of claim 1, wherein the plurality of laser emitting elements comprise five or more edge emitting lasers or vertical-cavity surface-emitting lasers (VCSELs).

8. The depth camera of claim 1, wherein the plurality of laser emitting elements comprise five or more parallel laser stripes fabricated on a same semiconductor substrate.

9. The depth camera system of claim 1, wherein IR light exiting the micro-lens array comprises the IR light output by the optical module that illuminates the capture area.

10. A method for use by a depth camera, the method comprising:
    outputting infrared (IR) light from an optical module of the depth camera to thereby illuminate a capture area with the IR light, wherein a portion of the IR light that has reflected off one or more objects within the capture area is detected by an image pixel detector array;
wherein the outputting IR light from the optical module includes emitting a plurality of separate IR laser beams from a plurality of laser emitting elements towards a micro-lens array that includes a two-dimensional array of substantially identical lenslets provided along two axes on a common surface of the micro-lens array such that
adjacent IR laser beams at least partially overlap one another prior to being incident on the micro-lens array, and
for each lenslet of at least a majority of the lenslets in the two-dimensional array of lenslets provided on the common surface of the micro-lens array, the lenslet is at least partially filled by IR light corresponding to more than one of the IR laser beams;
wherein a number of the lenslets is greater than a number of laser emitting elements;
wherein a center-to-center distance between any two of the laser emitting elements that are adjacent to one another is less than 100 µm; and
wherein a center-to-center distance between any two of the laser emitting elements that are not adjacent to one another is less than 1 mm.

11. The method of claim 10, wherein:
a center-to-center distance between any two laser emitting elements that are adjacent to one another in the optical module is less than 100 µm; and
a center-to-center distance between any two of the laser emitting elements that are not adjacent to one another in the optical module is less than 1 mm.

12. The method of claim 10, wherein:
the two-dimensional array of lenslets comprises at least a 7×7 array of lenslets provided on the common surface of the micro-lens array; and
for each lenslet of the at least the majority of the lenslets, in the at least 7×7 array of lenslets provided on the common surface of the micro-lens array, the lenslet is at least partially filled by IR light corresponding to more than one of the IR laser beams.

13. The method of claim 10, further comprising:
detecting a portion of the IR light that has reflected off one or more objects within the capture area;
producing a depth image based on the detected portion of the IR light; and
updating an application based on the depth image.

14. The method of claim 10, wherein the emitting the plurality of separate IR laser beams towards the micro-lens array that includes the plurality of lenslets is performed such that each of the IR laser beams at least partially overlaps each of the other IR laser beams of the plurality of separate IR laser beams, prior to the plurality of IR laser beams being incident on the micro-lens array.

15. The method of claim 10, wherein the emitting the plurality of separate IR laser beams towards the micro-lens array that includes the plurality of lenslets is performed such that each lenslet of the micro-lens array, is at least partially filled by each IR laser beam of the plurality of IR laser beams.

16. The method of claim 10, wherein the emitting the plurality of separate IR laser beams towards the micro-lens array that includes the two-dimensional array of lenslets provided on the common surface of the micro-lens array is performed such that each lenslet of the at least a majority of the two-dimensional array of lenslets provided on the common surface of the micro-lens array, is completely filled by more than one of the plurality of IR laser beams.

17. An optical module for use with a depth camera system for use in obtaining a depth image of a capture area, the optical module comprising:
a plurality of laser emitting elements each of which is configured to emit a corresponding infrared (IR) laser beam, wherein a portion of IR light corresponding to the IR laser beams reflects off one or more objects within the capture area and is detected by an image pixel detector array; and
a micro-lens array including a two-dimensional array of substantially identical lenslets provided along two axes on a common surface of the micro-lens array;
wherein IR laser beams emitted by adjacent ones of the laser emitting elements at least partially overlap one another prior to being incident on the micro-lens array;
wherein for each lenslet of at least a majority of the lenslets in the two-dimensional array of substantially identical lenslets provided on the common surface of the micro-lens array, the lenslet is configured to be at least partially filled by IR light corresponding to IR laser beams emitted by more than one of the laser emitting elements;
wherein a number of lenslets, in the two-dimensional array of substantially identical lenslets provided on the common surface of the micro-lens array, is greater than a number of laser emitting elements;
wherein a center-to-center distance between any two of the laser emitting elements that are adjacent to one another is less than 100 µm; and
wherein a center-to-center distance between any two of the laser emitting elements that are not adjacent to one another is less than 1 mm.

18. The optical module of claim 17, wherein:
a center-to-center distance between any two of the laser emitting elements that are adjacent to one another is less than 100 µm; and
a center-to-center distance between any two of the laser emitting elements that are not adjacent to one another is less than 1 mm.

19. The optical module of claim 17, wherein:
the two-dimensional array of substantially identical lenslets provided on the common surface of the micro-lens array of the optical module comprises at least a 7×7 array of substantially identical lenslets provided on the common surface of the micro-lens array; and
for each lenslet of at least a majority of the lenslets, in the at least 7×7 array of substantially identical lenslets provided on the common surface of the micro-lens array, the lenslet is configured to be at least partially filled by IR light corresponding to IR laser beams emitted by more than one of the laser emitting elements.

20. The optical module of claim 17, wherein the plurality of laser emitting elements comprise five or more edge emitting lasers or vertical-cavity surface-emitting lasers (VCSELs).

* * * * *